United States Patent
Yang

(10) Patent No.: US 10,915,739 B2
(45) Date of Patent: Feb. 9, 2021

(54) FACE RECOGNITION DEVICE, FACE RECOGNITION METHOD, AND COMPUTER READABLE STORAGE MEDIUM

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventor: Chin-Wei Yang, Tucheng (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 46 days.

(21) Appl. No.: 16/381,254

(22) Filed: Apr. 11, 2019

(65) Prior Publication Data
US 2020/0210687 A1    Jul. 2, 2020

(30) Foreign Application Priority Data
Dec. 27, 2018    (CN) ............... 2018 1 1613890

(51) Int. Cl.
*G06K 9/00*    (2006.01)
*G06K 9/62*    (2006.01)

(52) U.S. Cl.
CPC ..... *G06K 9/00295* (2013.01); *G06K 9/00228* (2013.01); *G06K 9/00275* (2013.01); *G06K 9/00906* (2013.01); *G06K 9/6256* (2013.01)

(58) Field of Classification Search
CPC ........... G06K 9/00228; G06K 9/00275; G06K 9/00906; G06K 9/6256
See application file for complete search history.

(56) References Cited

U.S. PATENT DOCUMENTS

| | | | |
|---|---|---|---|
| 2013/0222564 A1* | 8/2013 | Park ..................... | H04N 5/2354 348/77 |
| 2013/0266193 A1* | 10/2013 | Tiwari ................ | G06F 16/5854 382/115 |
| 2017/0090584 A1* | 3/2017 | Tang ........................ | G06F 3/165 |
| 2019/0130574 A1* | 5/2019 | Li .............................. | G06T 7/11 |
| 2019/0266388 A1* | 8/2019 | Kolagunda ........ | G06K 9/00308 |
| 2020/0065564 A1* | 2/2020 | Romdhani ......... | G06K 9/00228 |

* cited by examiner

*Primary Examiner* — Edward Park
(74) *Attorney, Agent, or Firm* — ScienBiziP, P.C.

(57) ABSTRACT

A face recognition method applied to establish authentic or artificial faces before searching for a person match in a database includes establishing a deep network model, obtaining training data and training the deep network model using the training data. An original image of a human face and a depth image corresponding to the original image are obtained, and authenticity or artificiality is determined by preset methods including use of cosine similarity algorithm. Matching an original image determined as authentic against face images pre-stored in an image database and outputting any match, when the original image is the image of a real person. A face recognition device is also provided.

14 Claims, 7 Drawing Sheets

US 10,915,739 B2

FACE RECOGNITION DEVICE, FACE RECOGNITION METHOD, AND COMPUTER READABLE STORAGE MEDIUM

FIELD

The disclosure generally relates to facial recognition.

BACKGROUND

Biometrics and biometric readings are convenient and widely used. Face recognition has unique advantages, since the accuracy of deep learning in face recognition has improved. However, while face recognition technology is constantly improving, many problems remain to be solved, such as whether the face image is that of a real person or a computer-generated or a computer-altered image.

BRIEF DESCRIPTION OF THE DRAWINGS

Implementations of the present technology will now be described, by way of embodiments, with reference to the attached figures.

DETAILED DESCRIPTION

Figure 1:
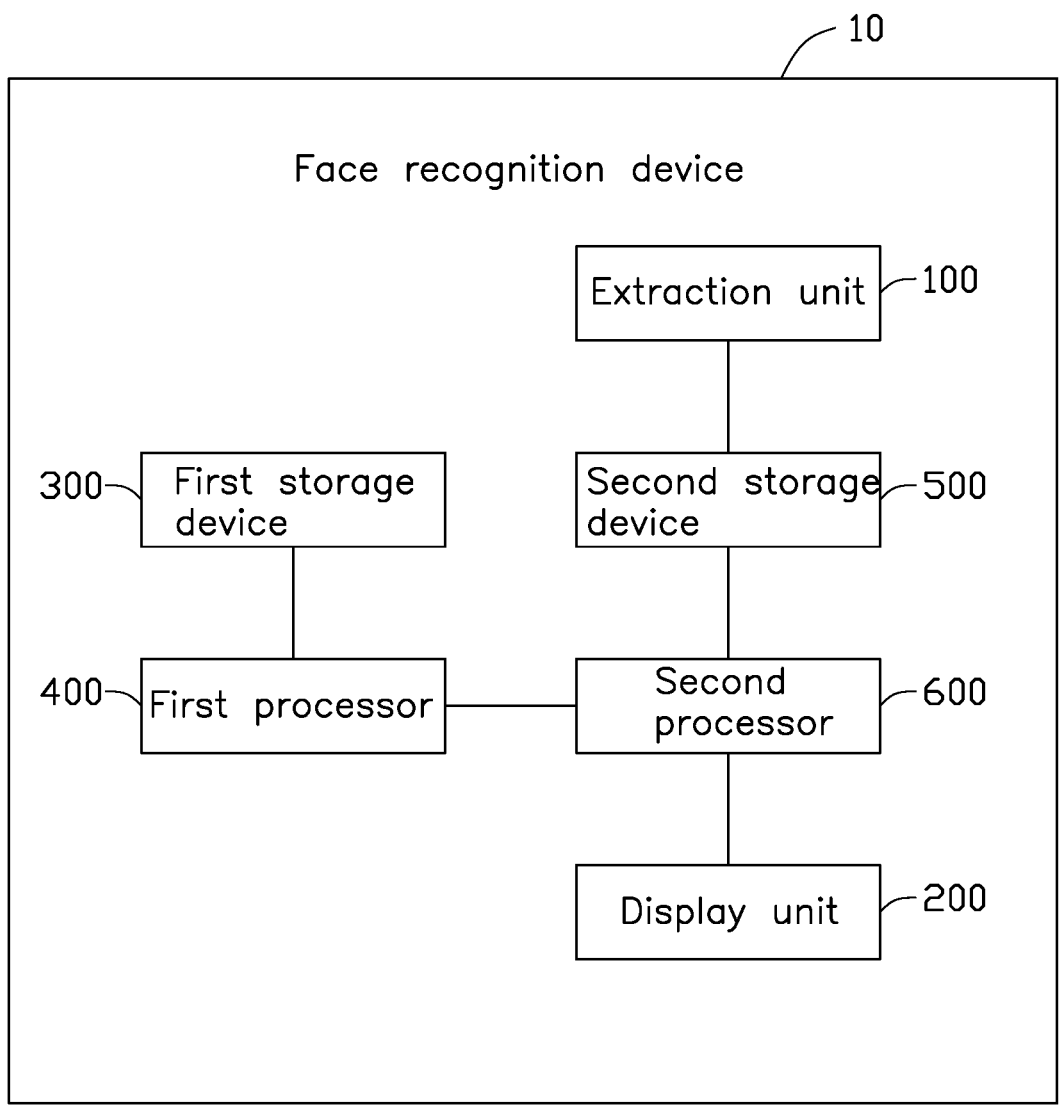
FIG. 1 is a schematic diagram of a face recognition device in accordance with an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to", it specifically indicates open-ended inclusion or membership in a so-described combination, group, series, and the like.

FIG. 1 illustrates a face recognition device 10 of an embodiment of the present disclosure. The face recognition device 10 can include an extraction unit 100, a display unit 200, at least one storage device, and at least one processor. In at least one embodiment, the at least one storage device includes a first storage device 300 and a second storage device 500. The at least one processor includes a first processor 400 and a second processor 600. The first processor 400 and the first storage device 300 can be electrically connected to each other. The first processor 400 can communicate with the second processor 600. The second processor 600, the second storage device 500, the extraction unit 100, and the display unit 200 are electrically connected.

The face recognition device 10 can operate within an embedded platform, including a terminal computer or other embedded platform.

The extraction unit 100 is configured to extract an original image and a depth image of a human face. The original image and the depth image have a same resolution.

In this embodiment, the extracting unit 100 includes, but is not limited to, a still image camera, a dynamic image camera, and a depth camera.

The still image camera may be a smart camera. The smart camera uses a full glass lens, which has better optical performance than the resin lens, the picture being more transparent and finer. The resolution of the image is high and small details in the face can be clearly recorded. The smart camera can obtain a good viewing quality even on a cloudy day with weak light, but cost performance is high. The still image camera can adopt a connection method such as WIFI and BLUETOOTH.

The dynamic image camera may be a video camera. The video camera uses advanced compression technology to record vivid, lifelike 1080p HD video clips that can capture even the tiniest facial details. The camera's compression process is shorter, enabling fast and smooth uploading of captured video while reducing processor requirements. The dynamic image camera can adopt a connection method such as a USB interface.

The depth camera may be a dual depth of field camera with dual depth of field sensor, a color camera, and infrared projection. The depth camera can strengthen face feature recognition, and can be used for fine face recognition, emotional reaction, and accurate motion recording of the human half body.

The still image camera, the dynamic image camera, and the depth camera work together to obtain an original image of the face and the corresponding depth image.

The first storage device 300 can be configured to store a deep network model and training data. The deep network model is trained by the training data. The training data include, but are not limited to, training images, weight values, and training parameters. Specifically, the training images include a plurality of portraits, of which 75% are training images and the other 25% are test images. The weight value is a weight value between nodes and nodes in the network of the deep network model, and the weight value may include an initial weight value and an adjusted weight value. The training parameters include training accuracy and values of losses. The training accuracy and the loss values are calculated by a specific function. For a network, high accuracy and a lowest loss are important.

The first storage device 300 also stores program code for training the depth network model.

The first storage device 300 can be, but is not limited to, read-only memory (ROM), random-access memory (RAM), programmable read-only memory (PROM), erasable programmable ROM (EPROM), one-time programmable read-only memory (OTPROM), electrically EPROM (EEPROM), compact disc read-only memory (CD-ROM), hard disk, solid state drive, or other forms of electronic, electromagnetic, or optical recording medium.

The first processor 400 can be a central processing unit (CPU), a digital signal processor, a single chip microcomputer, or other equivalent dedicated chip, adapted to implement each instruction.

The second storage device 500 stores an image database for storing facial images of persons. The face images include, but are not limited to, the original image of a human face, a depth image corresponding to the original image, and a matching image of a matchable person.

The second storage device 500 further stores related information of face detection and face recognition, and the related information include statistics, a face detection method, and a cosine similarity method.

The statistics include, but are not limited to, an average value and a standard deviation factor of the face, an average value of eyes and nose area, and facial contours. The average value of eyes and nose area is calculated by Haar face detection method. The facial contour is detected by a preset facial contour detecting function, the facial contour detecting function searches for points of the facial contour to obtain a set of points.

The face detection method uses the original image and the depth image to determine whether the original image is an image of a real person.

The second storage device 500 further stores a neural network model. After deep learning, the neural network model can output multi-dimensional characteristic values from the original images. The characteristic values can be a corresponding value in the deep learning of the neural network, such as characteristic values of the eyes, nose, or facial contours of the face.

The second storage device 500 can further store program code.

The second storage device 500 can be, but is not limited to, read-only memory (ROM), random-access memory (RAM), programmable read-only memory (PROM), erasable programmable ROM (EPROM), one-time programmable read-only memory (OTPROM), electrically EPROM (EEPROM), compact disc read-only memory (CD-ROM), hard disk, solid state drive, or other forms of electronic, electromagnetic, or optical recording medium.

The second processor 600 can be a central processing unit (CPU), a digital signal processor, a single chip microcomputer, or other equivalent dedicated chip adapted to implement each instruction.

The display unit 200 can display a result of the processing by the processor and display the face recognition and other information. Face-related information can include, but is not limited to, the original image of a human face, the depth image corresponding to the original image, and the ID and other information as to the person. The display unit 200 can include at least one display.

In other embodiments, the first storage device 300 and the second storage device 500 can be one storage device, and the first processor 400 and the second processor 600 can be one processor.

Figure 2:
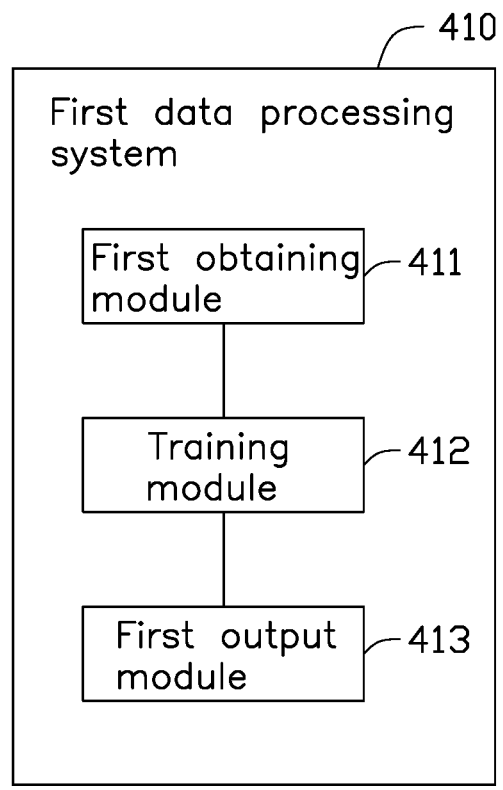
FIG. 2 is a schematic diagram of an embodiment of a first data processing system in the device of FIG. 1.

FIG. 2 illustrates a first data processing system 410 executed in the first processor 400. The first data processing system 410 may include several modules, which are a collection of software instructions stored in the first storage device 300 and are executed by the first processor 400. In the embodiment as disclosed, the first data processing system 400 may include a first obtaining module 411, a training module 412, and a first output module 413.

The first obtaining module 410 is configured to obtain the deep network model and the training data. The training data include, but are not limited to, training images, weight values, and training parameters. Specifically, the training pictures includes a plurality of portrait images, of which 75% are training images and the other 25% are test images. The weight value is a weight value between nodes and nodes in the network of the deep network model, and the weight value may include the initial weight value and the adjusted weight value. The training parameters include the training accuracy and the values of losses. The higher the accuracy and the lower the loss value are preferred.

The training module 412 is configured to train the deep network model using the training data. The training process using the migration learning method. Migration learning, also known as fine-tuning, uses the architecture of deep neural network and pre-trained networks to achieve initial object detection. Migration learning is given the task of learning knowledge or experience from previous tasks and applying them to new tasks. In this embodiment, the trained deep network model can be used for face recognition. In the training process, the adjusted weights that are finally applied to the face recognition are used for training. The deep network model migration learning is applied to face recognition.

The first output module 413 is configured to output the trained deep network model. The trained deep network model can be used to reorganize the face in an image.

Figure 3:
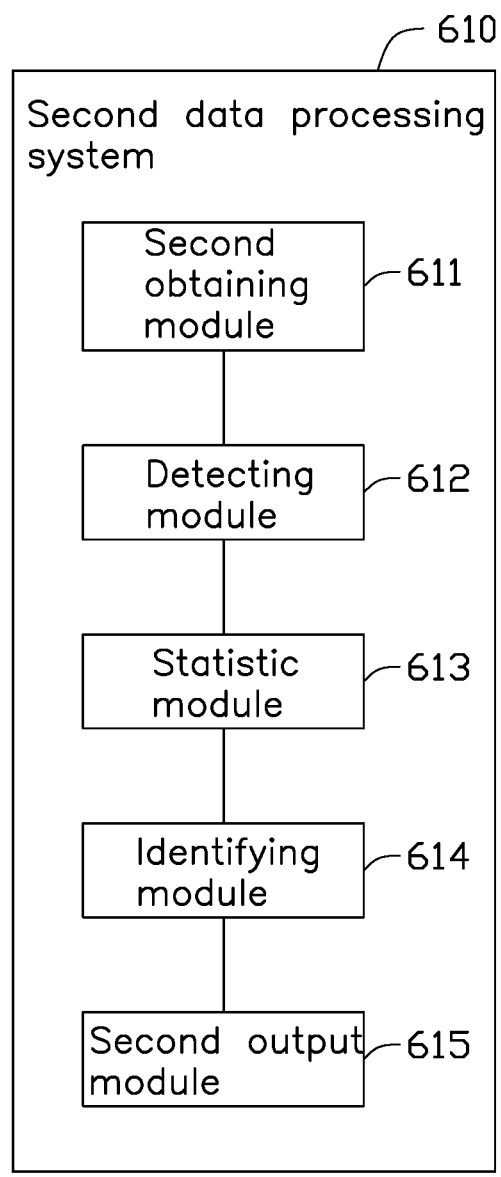
FIG. 3 is a schematic diagram of an embodiment of a second data processing system.

FIG. 3 illustrates a second data processing system 610 executed in the second processor 600. The second data processing system 400 may include several modules, which are a collection of software instructions stored in the second storage device 500 and are executed by the second processor 600. In the embodiment as disclosed, the first data processing system 400 may include a second obtaining module 611, a detecting module 612, a statistic module 613, an identifying module 614, and a second output module 615.

The second obtaining module 611 is configured to obtain an original image of a human face, a depth image corresponding to the original image with an equivalent resolution, and a matching image of a matchable person.

The detecting module 612 is configured to detect whether the original image of a human face is an image of real person, using a face detection method. The face detection method uses a statistical method to determine the authenticity of an original image according to the convex face coordinates of the depth of field.

The statistic module 613 is configured to collect information from a face image using the statistical method. The information of face can include, but is not limited to, the average value and the standard deviation factor of the face, the average value of eyes and nose area, and facial contours.

In collecting the average value and the standard deviation factor of the face, the face image is captured in the depth image, and the average value and the standard deviation factor of the face are obtained. As the human face has different depths and the picture effectively presents a face in three-dimensional rather than two-dimensional form, it is possible to know whether the image is of a real person image or of a picture or virtual picture of a human face by the average value and standard deviation factor of the image. The average value can be used to determine whether the image is within a reasonable range of depth of field. The standard deviation factor can be used for variations in the depth of the face in the image.

In collecting the average value of eyes and nose area, the difference between the depth of the eyes and the depth of the nose is largest difference, and rectangular coordinates of the eyes and the nose area can be obtained using the face detection method. Specifically, the Haar Cascades include haarcascade_mcs_nose.xml and haarcascade_eye.xml algorithms to classify faces and non-faces. After capturing the rectangular coordinate of the eyes and nose area in the depth image, the difference between the average value of the eyes and the nose area can be used to determine whether the image is a real person image or just a picture of a face.

In collecting the facial contours, a preset facial contour detecting function is used to search for points of the facial contours, a set of points of the facial contours being obtained. The set of points can also be used to determine whether the image is of a real person image or otherwise.

The identifying module 614 is configured to detect whether the image found to be of a real person belongs to a person pre-stored in the system or person unknown. Specifically, the face recognition is performed by a cosine similarity method. The cosine similarity method obtains a similarity between two vectors by measuring the cosine of the angle between the two vectors. The cosine of zero degrees is 1, and the cosine of any other angle is less than 1, the minimum being −1. Therefore, the cosine of the angle between the two vectors determines whether the two vectors substantially point in the same direction. When two vectors have the same pointing direction, the value of cosine similarity is 1. When the angle between two vectors is 90°, the value of cosine similarity is 0. When the two vectors point in opposite directions, the value of cosine similarity is −1. Therefore, the similarity of two images can be established by the cosine similarity.

The second output module 615 is configured to output information as to the recognized face. If it is recognized that the real person image is a match for an identity pre-stored in the image database, the information of the person identified is output. If the real person image is not matched in the image database, a prompt as to "unknown person" is output.

Figure 4:
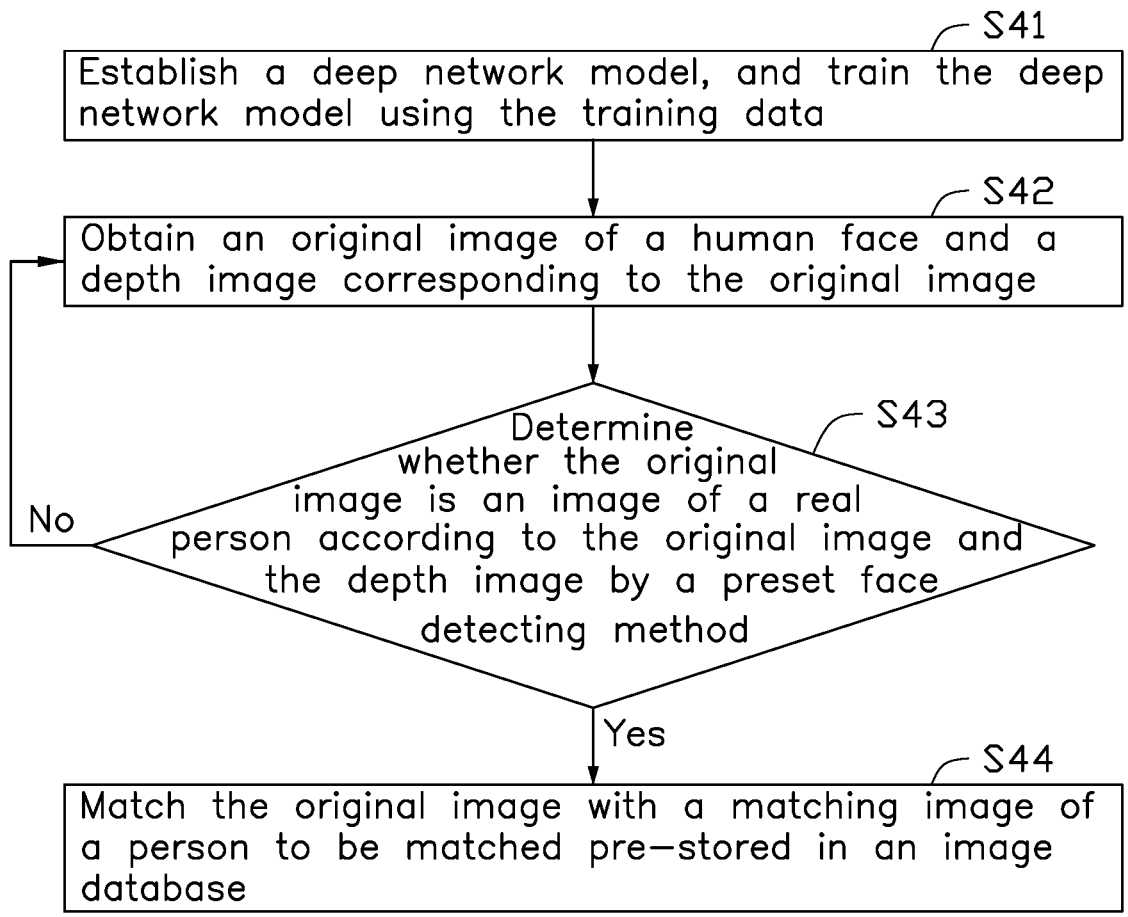
FIG. 4 is a flow chart of an embodiment of a face recognition method.

Referring to FIG. 4, the present disclosure provides a face recognition method. The method can begin at block S41.

At block S41, a deep network model is established, and training data is obtained to the train the deep network model.

The deep network model and the training data are stored in the first storage device 300. The first processor 400 trains the deep network model by the training data. The training data include, but are not limited to, training images, weight values, and training parameters. The training images include a plurality of portraits, of which 75% are training pictures and 25% are test images. The weight value is a weight value between nodes and nodes in the network of the deep network model, and the weight value may include an initial weight value and an adjusted weight value. The training parameters include training accuracy and loss values. It can be understood that the training accuracy and values of losses have specific function calculations. The higher the accuracy, the better, and the lower the loss value, the better. For a network, a high accuracy and a lowest loss are important.

In at least one embodiment, the training process includes two processes.

In a first process, the first obtaining module obtains the deep network model and the training data. The training module 412 trains the deep network model using the training images and the original weight values for 20 cycles, then uses the test images to test and adjust the weight value to obtain the adjusted weight value. The training module 412 trains the deep network model using the training images and the adjusted weight value for 20 cycles, and the deep network model with a high accuracy and lowest loss is obtained. The above cycle period can be any number of cycle periods until the deep network model with a high accuracy and lowest loss is obtained.

In a second process, the deep network model carries on migration learning. Firstly, a new task, namely face recognition, is given to the deep network model after training in the first process. The migration learning uses the pre-stored face images. The deep network model is trained using the adjusted weight value and the pre-stored face images.

Then, the first output module 413 output the deep network model.

At block S42, an original image of a human face and a depth image corresponding to the original image are obtained.

The still image camera and the dynamic image camera of the extraction unit 100 can obtain the original image of the human face. The depth image corresponding to the original image can be obtained by the depth camera.

At block S43, whether the original image is an image of a real person is determined according to the original image and the depth image by the preset face recognition method.

If the original image is not the image of the real person, the process returns to block S42; otherwise, the process goes to block S44. If the original image is the image of the real person, the face recognition is performed on the original image. The specific process will be described later.

Figure 5:
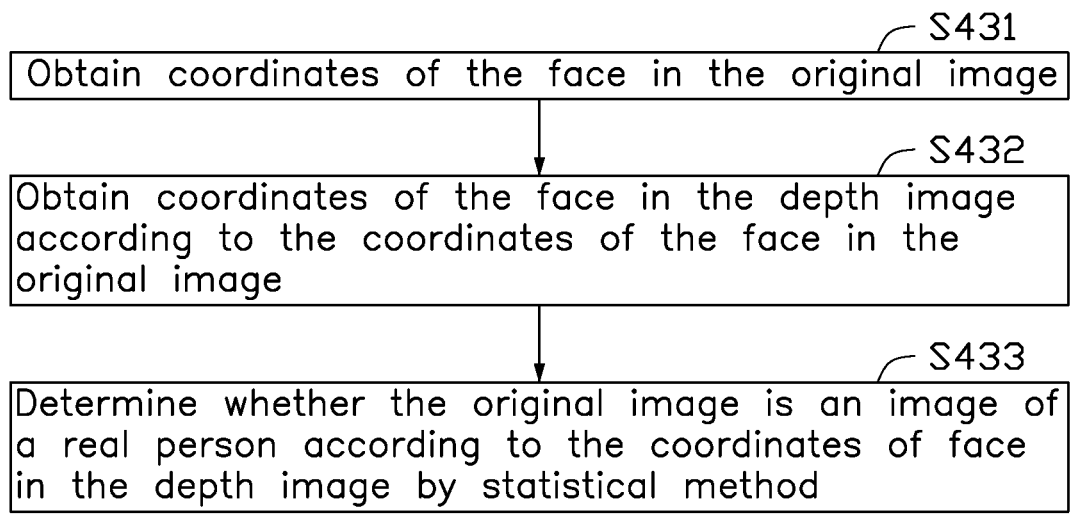
FIG. 5 is a flow chart of an embodiment of a face detecting method.

As shown in FIG. 5, the face detecting method includes the steps as follows.

At block S431, the coordinates of the face in the original image are obtained.

The second obtaining module 611 obtain the original image of the human face. A face detection function is preset in the second storage device 500. The second processor 600 obtains the rectangular coordinates of the face according to the preset face detection function. The rectangular coordinates include the upper left vertex and lower right vertex coordinates of the rectangle. It can be understood that the rectangular coordinates can also be the coordinates of the lower left vertex and upper right vertex.

At block S432, the coordinates of the face in the depth image is obtained according to the face coordinates of the original image.

The second processor 600 obtains the coordinates of the face in the depth image.

At block S433, whether the original image is an image of a real person is determined according to the coordinates of face in the depth image by statistical method.

The second storage device 500 stores the related information for face recognition, and the related information include the statistics. The statistics can include, but is not limited to, an average value and a standard deviation factor of the face, an average value of eyes and nose area, and facial contours. The average value of eyes and nose area is calculated by Haar face detection method. The facial contours is detected by a preset facial contour detecting function, and the facial contour detecting function searches for points of the facial contours to obtain a set of points of the facial contours. Whether the original image is an image of a real person or a picture is determined according to the statistics and the face coordinates of the depth image.

Figure 6:
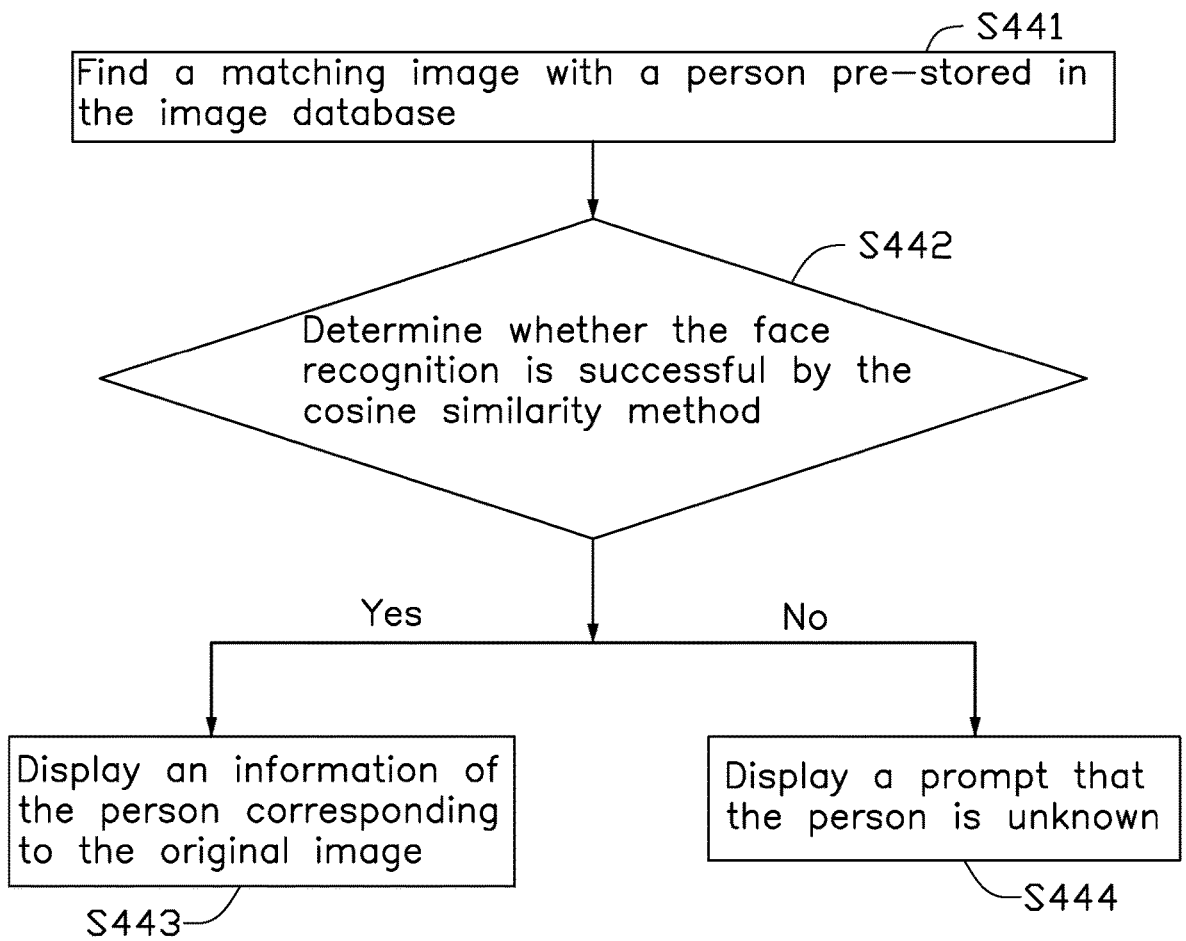
FIG. 6 is a flow chart of a method for matching an original image with a matching image of a matchable person pre-stored in an image database.

At block S44, the original image is matched with the images of persons pre-stored in the image database by the deep network model. As shown in FIG. 6, the process at block S44 includes the following steps.

At block S441, a matching image with a matchable person pre-stored in the image database is found by the deep network model.

The second processor 600 can find the person with the highest degree of matching with the image of real person according to the feature value output by the deep network model. Then, the second processor 600 finds the matching image corresponding the person to be matched in the image database according to the person with the highest matching degree.

At block S442, whether the face recognition is successful is determined by the cosine similarity method.

The identifying module 614 compares the original image of the real person and the matching image using the cosine similarity method, and determines whether the face recognition is successful.

The cosine similarity method obtain a similarity between two vectors by measuring the cosine of the angle between the two vectors. The cosine of the zero degrees is 1, and the cosine of any other angle is less than 1, the minimum being −1. Therefore, the cosine of the angle between the two vectors determines whether the two vectors substantially point in the same direction. When two vectors have the same pointing direction, the value of cosine similarity is 1. When the angle between two vectors is 90°, the value of cosine similarity is 0. When the two vectors point in opposite directions, the value of cosine similarity is −1. Therefore, the similarity of two images can be established by the cosine similarity.

If the face recognition is successful, the process goes to block S443, the information of the person corresponding to the original image is displayed. The second output module 615 controls the display unit 200 to display the information of the person including the name of the person.

If the face recognition is unsuccessful, a prompt that the person is unknown is displayed. The second output module 615 controls the display unit 200 to display "UNKNOWN PERSON".

Figure 7:
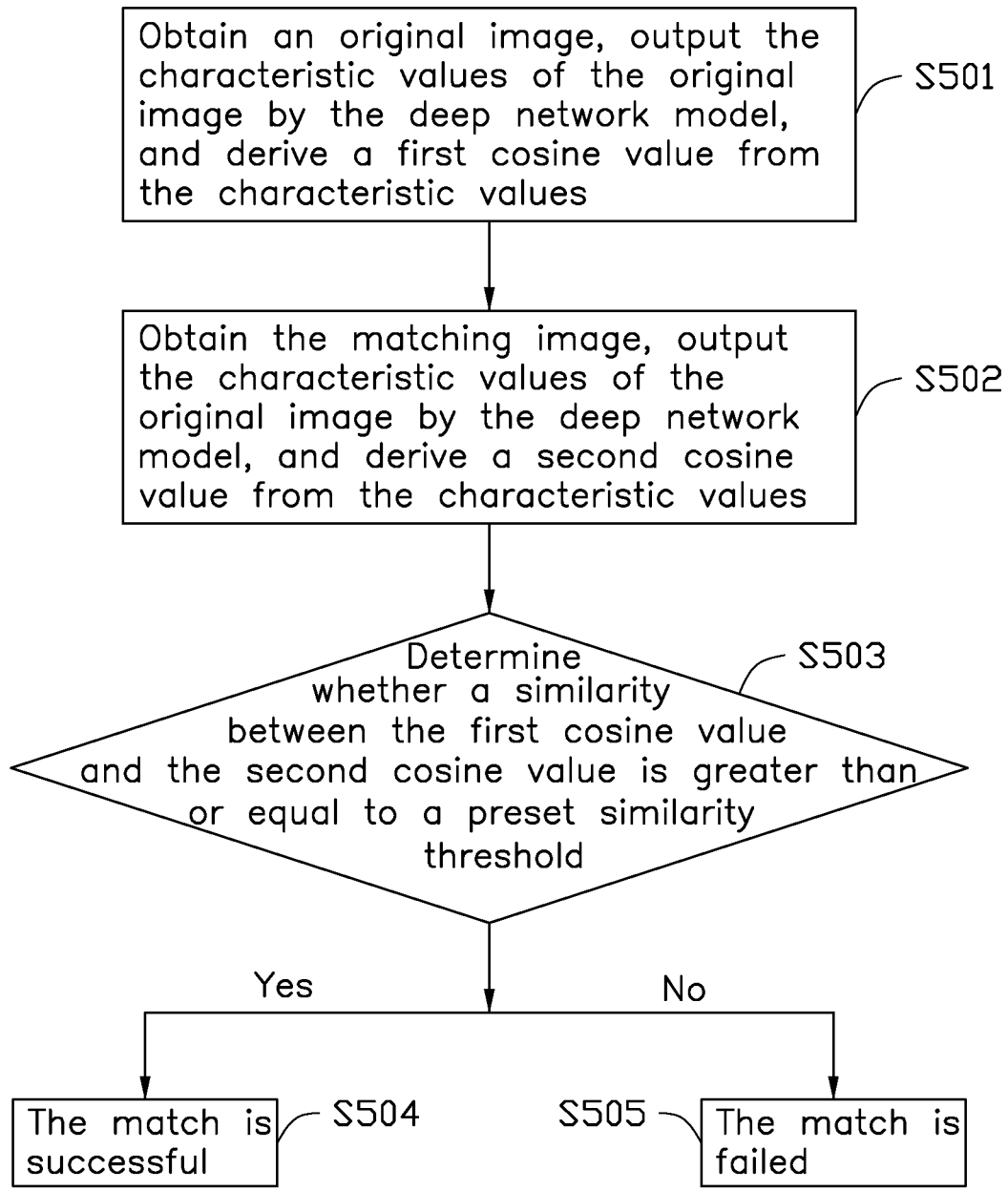
FIG. 7 is a flow chart of a method of face recognition using a cosine similarity method.

FIG. 7 illustrates a method of face recognition using the cosine similarity method.

At block S501, the original image is obtained, the characteristic values of the original image is output by the neural network model, and a first cosine value is derived from the characteristic values.

The neural network model is pre-stored in the second storage device 500. After deep learning, the neural network model can output multi-dimensional characteristic values from the original images. In at least one embodiment, 4096 dimensional characteristic values can be output. The second storage device 600 can obtain the first cosine value according to the characteristic values. The first cosine value can be fit by a set of multiple cosine values.

At block S502, the matching image is obtained, the characteristic values of the matching image is output by the neural network model, and a second cosine value is derived from the characteristic values.

Similarly, the second storage device 600 can obtain the second cosine values according to the characteristic values. The second cosine value can be fit by a set of multiple cosine values.

At block S503, whether a similarity between the first cosine value and the second cosine value is greater than or equal to a preset similarity threshold is determined.

If YES, the process goes to block S504, the match of the original image and the matching image is successful. If NO, the process goes to block S505, the match of the original image and the matching image is unsuccessful.

The present disclosure also provides a computer storage medium storing computer program code that, when executed on a computing device, causes the computing device to perform the face recognition method described above.

The face recognition method provided by the present disclosure uses a migration learning method to train the deep network model, and uses the trained deep network model in face recognition. In face recognition, the face detection method is used to detect whether the original image is a real person image or a picture. If the detection result is the real person image, the face recognition is performed using a cosine similarity method to determine whether the original image is pre-stored in the image database. If the original image is pre-stored in the image database, the person information corresponding to the original image is displayed. By using the face recognition method, the image of the real person is accurately distinguished and the unknown person is recognized, the recognition accuracy is high, and the application is wide.

The face recognition method can be used, but does not limited to, access control/attendance system, building security monitoring access control system, information/device login, smart retail consumer analysis, and photo face recognition.

A person skilled in the art can understand that all or part of the process in the above embodiments can be implemented by a computer program to instruct related hardware, and that the program can be stored in a computer readable storage medium. When the program is executed, a flow of an embodiment of the methods as described above may be included.

In addition, each functional unit in each embodiment of the present invention may be integrated in one processor, or each unit may exist physically separately, or two or more units may be integrated in one same unit. The above integrated unit can be implemented in the form of hardware or in the form of hardware plus software function modules.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A face recognition method comprising:
    establishing a deep network model, obtaining training data and training the deep network model by the training data;
    obtaining an original image of a human face and a depth image corresponding to the original image;
    determining whether the original image is an image of a real person according to the original image and the depth image by a preset face detecting method;
    returning to the process of obtaining an original image of a human face, when the original image is not the image of the real person; and
    matching the original image with a matching image of a matchable person pre-stored in an image database, comprising:
    finding a matching image with a matchable person pre-stored in the image database;
    determining whether the face recognition is successful using a cosine similarity method, comprises: obtaining an original image, outputting the characteristic values of the original image by the deep network model, and deriving a first cosine value from the characteristic values; obtaining the matching image, outputting the characteristic values of the original image by the deep network model, and deriving a second cosine value from the characteristic values; in response that a similarity between the first cosine value and the second cosine value is greater than or equal to a preset similarity threshold, determining that the match is successful; or in response that the similarity between the first cosine value and the second cosine value is less than the preset similarity threshold, determining that the match is unsuccessful; and displaying information of the person corresponding to the original image, in response that the face recognition is successful; and outputting a matching result, when the original image is the image of the real person.

2. The face recognition method of claim 1, wherein the deep network model is trained by a migration learning method.

3. The face recognition method of claim 1, wherein the face detecting method comprises:
obtaining coordinates of the face in the original image;
obtaining coordinates of the face in the depth image according to the coordinates of the face in the original image; and
determining whether the original image is an image of a real person according to the coordinates of face in the depth image by a statistical method.

4. The face recognition method of claim 3, wherein statistics comprises an average value and a standard deviation factor of the face, an average value of eyes and nose area, and facial contours.

5. The face recognition method of claim 4, wherein the average value of eyes and nose area is calculated by Haar face detection method.

6. The face recognition method of claim 4, wherein the facial contours are detected by a preset facial contour detecting function, and the facial contour detecting function searches for points of the facial contours to obtain a set of points of the facial contours.

7. A face recognition device, comprising:
a display unit;
a processor; and
a storage device storing one or more programs, when executed by the processor, the one or more programs causing the processor to:
establish a deep network model, obtained training data and training the deep network model using the training data;
obtain an original image of a human face and a depth image corresponding to the original image;
determine whether the original image is an image of a real person according to the original image and the depth image by a preset face detecting method;
return to the process of obtaining an original image of a human face, when the original image is not the image of the real person; and
match the original image with a matching image of a matchable person pre-stored in an image database, comprising:
finding a matching image with a matchable person pre-stored in the image database;
determining whether the face recognition is successful using a cosine similarity method, comprises: obtaining an original image, outputting the characteristic values of the original image by the deep network model, and deriving a first cosine value from the characteristic values; obtaining the matching image, outputting the characteristic values of the original image by the deep network model, and deriving a second cosine value from the characteristic values; in response that a similarity between the first cosine value and the second cosine value is greater than or equal to a preset similarity threshold, determining that the match is successful; or in response that the similarity between the first cosine value and the second cosine value is less than the preset similarity threshold, determining that the match is unsuccessful; and displaying information of the person corresponding to the original image, in response that the face recognition is successful; and outputting a matching result, when the original image is the image of the real person.

8. The face recognition device of claim 7, wherein the deep network model is trained by a migration learning method.

9. The face recognition device of claim 7, wherein the one or more programs further causes the processor to:
obtain coordinates of the face in the original image;
obtain coordinates of the face in the depth image according to the coordinates of the face in the original image; and
determine whether the original image is an image of a real person according to the coordinates of face in the depth image by statistical method.

10. The face recognition device of claim 9, wherein statistics comprises an average value and a standard deviation of the face, an average value of eyes and nose area, and facial contours.

11. The face recognition device of claim 10, wherein the average value of eyes and nose area is calculated by Haar face detection method.

12. The face recognition device of claim 10, wherein the facial contours are detected by a preset facial contour detecting function, and the facial contour detecting function searches for points of the facial contours to obtain a set of points of the facial contours.

13. A non-transitory storage medium having stored thereon instructions that, when executed by at least one processor of a computing device, causes the processor to perform a face recognition method, wherein the method comprises:
establishing a deep network model, obtained training data and training the deep network model using the training data;
obtaining an original image of a human face and a depth image corresponding to the original image;
determining whether the original image is an image of a real person according to the original image and the depth image by a preset face detecting method;
returning to the process of obtaining an original image of a human face, when the original image is not the image of the real person; and
matching the original image with a matching image of a matchable person pre-stored in an image database, comprising:
finding a matching image with a matchable person pre-stored in the image database;
determining whether the face recognition is successful using a cosine similarity method, comprises: obtaining an original image, outputting the characteristic values of the original image by the deep network model, and deriving a first cosine value from the characteristic values; obtaining the matching image, outputting the characteristic values of the original image by the deep network model, and deriving a second cosine value from the characteristic values; in response that a similarity between the first cosine value and the second cosine value is greater than or equal to a preset similarity threshold, determining that the match is successful; or in response that the similarity between the first cosine value and the second cosine value is less than the preset similarity threshold, determining that the match is unsuccessful; and displaying information of the person corresponding to the original image, in response that the face recognition is successful; and outputting a matching result, when the original image is the image of the real person.

14. The non-transitory storage medium of claim 13, wherein the face detecting method comprises:

obtaining coordinates of the face in the original image;

obtaining coordinates of the face in the depth image according to the coordinates of the face in the original image; and determining whether the original image is an image of a real person according to the coordinates of face in the depth image by a statistical method.

* * * * *